United States Patent
Rudolph et al.

(10) Patent No.: US 6,817,719 B2
(45) Date of Patent: Nov. 16, 2004

(54) ARRAY FOR PROJECTING A POLYCHROMATIC IMAGE ON A PROJECTION SURFACE

(75) Inventors: Guenter Rudolph, Jena (DE); Eberhard Piehler, Lehesen (DE); Marco Pretorius, Oberkochen (DE); Dirk Muehlhoff, Kunitz (DE)

(73) Assignee: Carl Zeiss Jena GmbH, Jena (DE)

( * ) Notice: Subject to any disclaimer, the term of this patent is extended or adjusted under 35 U.S.C. 154(b) by 89 days.

(21) Appl. No.: 10/433,825

(22) PCT Filed: Jun. 4, 2002

(86) PCT No.: PCT/EP02/06142

§ 371 (c)(1), (2), (4) Date: Dec. 7, 2003

(87) PCT Pub. No.: WO02/100114

PCT Pub. Date: Dec. 12, 2002

(65) Prior Publication Data

US 2004/0051850 A1 Mar. 18, 2004

(30) Foreign Application Priority Data

Jun. 7, 2001 (DE) .......................................... 101 27 620

(51) Int. Cl.[7] .............................................. G03B 21/28
(52) U.S. Cl. ................................ 353/37; 353/98; 349/7
(58) Field of Search .............................. 353/20, 31, 33, 353/34, 37, 98; 349/5, 7, 8, 9; 348/742, 743, 771

(56) References Cited

U.S. PATENT DOCUMENTS

| | | |
|---|---|---|
| 2,742,817 A | 4/1956 | Altman |
| 4,861,142 A | 8/1989 | Tanaka et al. |
| 5,032,021 A | 7/1991 | Kanatani et al. |
| 5,300,942 A | 4/1994 | Dolgoff |

(List continued on next page.)

FOREIGN PATENT DOCUMENTS

| | | |
|---|---|---|
| DE | 199 07 345 A1 | 9/2000 |
| DE | 199 63 312 A1 | 9/2000 |
| EP | 0 734 183 A2 | 9/1996 |

(List continued on next page.)

OTHER PUBLICATIONS

"Harness the Brilliance of LCoS", Mitsui & Co., Ltd.
Matthew Bone et al., "Novel Optical System Design for Reflective CMOS Technology," S–VISION Inc.
SPIE conference proceedings (1998); J. Brian Caldwell et al.; "Compact Projection Optics for Dual DMD Projectors,"; (2 pgs.).

Primary Examiner—William C. Dowling
(74) Attorney, Agent, or Firm—Patterson, Thuente, Skaar & Christensen, P.A.

(57) ABSTRACT

In an apparatus for projecting a multi-colored picture on a projection screen (17), having a light source (1) that emits multi-colored light, a color unit (9, 35), a first and a second light modulator (12, 13, 14) arranged following the color unit (9, 35), and a projection optics (16), wherein the color unit (9, 35) is illuminated with light from the light source (1) and separates light in a first and a second color and directs it on the first and second light modulator (12, 13), wherein the light modulators (12, 13, 14) modulate the light shining on them, in order to generate a color frame each of the multi-colored picture, and wherein the modulated light is superimposed to a common luminous beam by means of the color unit (9, 35), where the luminous beam illuminates the projection optics (16), and wherein an optics system (7, 23, 28, 31) that is illuminated by the common luminous beam is provided between the color unit (9, 35) and the projection optics (16) comprising a curved mirror (21, 24, 26), wherein the optics system (7, 23 28, 31) generates a multi-colored intermediate image in an intermediate image level (ZE) that is arranged in front of the projection optics (16), wherein the intermediate image is projected as the multi-colored picture on the projection screen (17) by the projection optics (16).

20 Claims, 6 Drawing Sheets

U.S. PATENT DOCUMENTS

Figure 1:
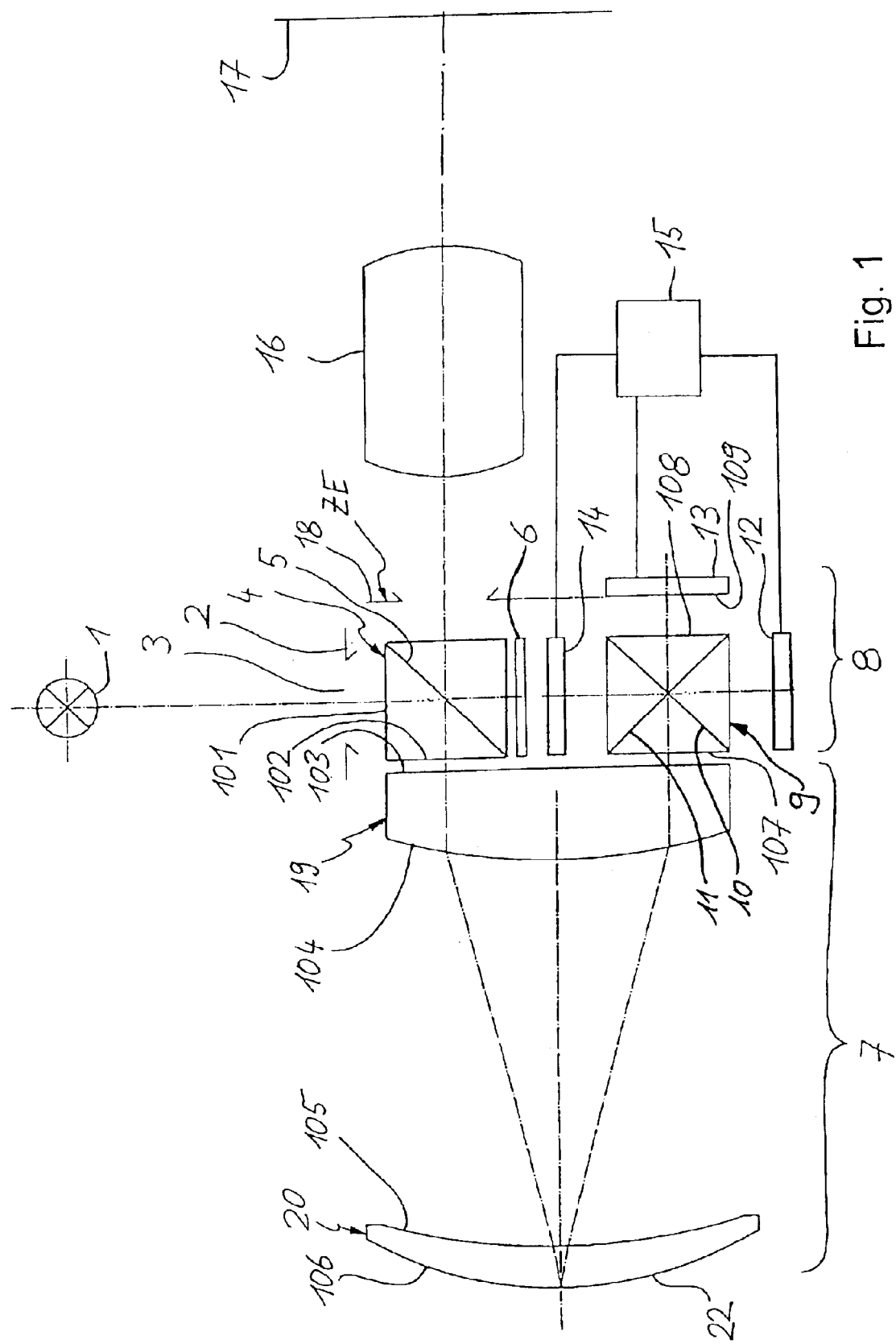

| | | |
|---|---|---|
| 5,580,146 A | 12/1996 | Maslow |
| 5,900,982 A | 5/1999 | Dolgoff et al. |
| 5,978,136 A | 11/1999 | Ogawa et al. |
| 6,120,152 A | 9/2000 | Nakayama et al. |
| 6,229,581 B1 | 5/2001 | Yamamoto et al. |
| 6,336,724 B1 | 1/2002 | Shouji et al. |
| 6,609,798 B1 * | 8/2003 | Milinusic et al. .............. 353/98 |
| 2003/0223044 A1 * | 12/2003 | Janssen ....................... 353/20 |

FOREIGN PATENT DOCUMENTS

| | | |
|---|---|---|
| EP | 1 052 856 A2 | 5/2000 |
| EP | 1 024 395 A2 | 8/2000 |
| EP | 1 033 614 A2 | 9/2000 |
| EP | 1 039 784 A1 | 9/2000 |
| EP | 1 043 620 A2 | 10/2000 |
| EP | 1 055 944 A1 | 11/2000 |
| EP | 1 055 954 A1 | 11/2000 |
| EP | 1 055 955 A2 | 11/2000 |
| EP | 1 056 071 A1 | 11/2000 |
| EP | 1 205 791 A1 | 5/2002 |
| WO | WO 98/35264 | 8/1998 |
| WO | WO 99/19758 | 4/1999 |
| WO | WO 99/26103 | 5/1999 |
| WO | WO 99/27410 | 6/1999 |
| WO | WO 00/31579 | 6/2000 |

* cited by examiner

ARRAY FOR PROJECTING A POLYCHROMATIC IMAGE ON A PROJECTION SURFACE

The invention relates to an apparatus for projecting a multi-colored picture on a projection screen, having a light source that emits heterochromatic light, a color unit arranged following the light source, having a first and a second light modulator arranged following the color unit, and a projection optics where the color unit can be illuminated with the light emitted from the light source and separates light of a first color and directs it on the first light modulator, and separates light of a second color and directs it on the second light modulator, where the light modulators modulate the light shining on them in order to create one color frame each of the multi-colored picture, and where the modulated light is superimposed to form a common luminous beam by means of the color unit, where the luminous beam illuminates the projection optics.

In such an apparatus, as is described in EP 0 734 183 A2, for example, the required focal intercept is very large due to the color unit provided between the projection optics and the light modulators by means of which the color frames are set. This necessitates a very complicated projection optics with numerous lenses which makes projection optics expensive and weighty. In addition, the color unit usually comprises glass elements with dichroic coatings, so that a long glass way exists between the light modulators and the projection optics which has to be passed through by the different-colored light in order to generate the color frames. The result is a transverse achromatic aberration due to the state of dispersion of the glass elements, so that the different color components of a pixel no longer overlap but are situated next to each other in the projection screen. This transverse achromatic aberration has to be compensated for by means of the projection optics, which in turn calls for a complicated structure of the projection optics.

In order to avoid the transverse achromatic aberration, lenses made of optical flint and lenses made of optical crown are combined in order to generate the required achromatization, wherein Flourite is often used which is very difficult to work. This makes the production of the projection optics very complicated. In addition, Fluorit has disadvantageous hygroscopic characteristics that can adversely affect the imaging characteristics of the projection optics over time.

Based on this situation, it is the object of the present invention to improve an apparatus of the above-mentioned kind for projecting a multi-colored picture on a projection screen in such a way that its design is simplified.

Taking an apparatus of the above-mentioned kind for projecting a multi-colored picture on a projection screen, the object is completed by connecting an optics system illuminated with a common luminous beam and having a curved mirror is provided between the color unit and the projection optics, where the optics system generates a multi-colored intermediate image in an intermediate image level arranged in front of the projection optics, where the multi-colored intermediate image is projected by the projection optics on the projection screen as the multi-colored picture.

The invention relates to an apparatus for projecting a multi-colored picture on a projection screen, having a light source that emits heterochromatic light, a color unit arranged following the light source, having a first and a second light modulator arranged following the color unit, and a projection optics where the color unit can be illuminated with the light emitted from the light source and separates light of a first color and directs it on the first light modulator, and separates light of a second color and directs it on the second light modulator, where the light modulators modulate the light shining on them in order to create one color frame each of the multi-colored picture, and where the modulated light is superimposed to form a common luminous beam by means of the color unit, where the luminous beam illuminates the projection optics.

In such an apparatus, as is described in EP 0 734 183 A2, for example, the required focal intercept is very large due to the color unit provided between the projection optics and the light modulators by means of which the color frames are set. This necessitates a very complicated projection optics with numerous lenses which makes projection optics expensive and weighty. In addition, the color unit usually comprises glass elements with dichroic coatings, so that a long glass way exists between the light modulators and the projection optics which has to be passed through by the different-colored light in order to generate the color frames. The result is a transverse achromatic aberration due to the state of dispersion of the glass elements, so that the different color components of a pixel no longer overlap but are situated next to each other in the projection screen. This transverse achromatic aberration has to be compensated for by means of the projection optics, which in turn calls for a complicated structure of the projection optics.

In order to avoid the transverse achromatic aberration, lenses made of optical flint and lenses made of optical crown are combined in order to generate the required achromatization, wherein Flourite is often used which is very difficult to work. This makes the production of the projection optics very complicated. In addition, Fluorit has disadvantageous hygroscopic characteristics that can adversely affect the imaging characteristics of the projection optics over time.

Based on this situation, it is the object of the present invention to improve an apparatus of the above-mentioned kind for projecting a multi-colored picture on a projection screen in such a way that its design is simplified.

Taking an apparatus of the above-mentioned kind for projecting a multi-colored picture on a projection screen, the object is completed by connecting an optics system illuminated with a common luminous beam and having a curved mirror is provided between the color unit and the projection optics, where the optics system generates a multi-colored intermediate image in an intermediate image level arranged in front of the projection optics, where the multi-colored intermediate image is projected by the projection optics on the projection screen as the multi-colored picture.

By providing the optics system that generates the intermediate image (preferably a real intermediate image) in the intermediate image level located in front of the projection optics (the intermediate image level can preferably also be located directly in front of the projection optics), the required focal intercept of the projection optics is much smaller in the apparatus according to the invention than the apparatus of the above-mentioned kind. This also lowers the optical requirements of the projection optics substantially, of course, so that the design of the projection optics is noticeably simplified. The number of required lenses of the projection optics is lower, in particular, which also allows for a weight reduction.

In addition, the projection optics can also be provided and designed entirely independently from the rest of the apparatus, since its task is to image the intermediate image generated in the intermediate image level, and not the picture-generating areas of the light modulators, on the projection screen.

Also, in the apparatus according to the invention, the projection optics may easily be replaced by another projection optics, so that the apparatus according to the invention may be adapted easily to diverse basic conditions, such as a wide angle projection or a projection where the optical axis of the projection optics includes an angle unequal to 90 degrees with the projection screen.

Besides folding of the path of the rays, the curved mirror also contributes to the imaging process, so that therefore the number of optic elements of the optics system may be further reduced.

The light modulators which are preferably reflective light modulators (which advantageously allow the realization of a very compact apparatus) have an image-generating area (rectangular, for instance) with a majority of pixels that can be selected independently from each other, from which the incoming light is being reflected modulated (such as with respect to its angle of reflection or direction of polarization), wherein reflected light is utilized in a first state of modulation for bright pixels, and reflected light in a second state of modulation is utilized for dark pixels, so that hereby pictures (or color frames) are generated on the light modulators or their image-generating areas. The light modulators can be designed in such a way, of course, that light is reflected only by the pixels of the bright picture elements, while no light is emanating from the pixels of the dark picture elements because incidental light is absorbed there.

In a preferred embodiment of the apparatus according to the invention, the optics system is a 1:1 image optics. This preferably means that the intermediate image has the same size as the color frames, which means that the lens diameter of the projection optics can be kept small. In addition, the imaging characteristics of the optics system are best.

In particular, the optics system can be structured such that the color frames in the intermediate image level are imaged reduced in size. This advantageously results in an even smaller design of the aperture of the projection optics and thus also its optical elements, which means that the projection optics can be produced more cost-efficiently and simply. In addition, a reduction in weight is accomplished so that the apparatus according to the invention becomes lighter overall.

The optics system of the apparatus according to the invention is preferably structured symmetrically with respect to the mirror. On the one hand, this results in a reduction of the number of optics elements required within the optics system, since they are being passed through twice. On the other hand, if the optics system is a symmetrical 1:1 imaging optics, the image distortion generated by the optics system is very small and is practically zero in the best-case scenario, thus basically non-existent.

A preferable embodiment of the apparatus according to the invention is such that the mirror of the optics system comprises a spherical curve. In that case, the mirror is easy to produce, which enables a cost-efficient optics system and thus a cost-efficient apparatus for projecting of a multi-colored picture.

In addition, the optics system of the apparatus according to the invention can be a catadioptrics optics (an optics that includes at least one imaging mirror and at least one imaging lens). Such optics allows for particularly good imaging characteristics at a small size with few optics elements, so that an advantageous weight reduction can be accomplished, as well.

In a preferable further embodiment of the apparatus according to the invention, the mirror of the optics system may consist of a reflective coating on a curved boundary surface of a transparent optics element turned away from the optics system. The advantage is that the number of elements of the optics system to be adjusted is reduced, so that it can be produced more quickly. Also, the reflective coating is administered on the boundary surface, thereby not comprising an open silvered boundary surface which could be contaminated easily. This ensures the reflective and imaging characteristics of the optics system to remain constant.

A particularly preferred further development of the apparatus according to the invention is that a third light modulator is arranged following the color unit, wherein the color unit separates a third color from the light emitted by the light source and directs it to a third light modulator, so that a third color frame can be set thereon. Since three light modulators are provided for three different color frames, a brilliant color picture consisting of the superimposed color frames can be generated without a problem.

Color frames in the primary colors red, green, and blue are preferably generated by the light modulators, from which the desired multi-colored picture with a high color brilliance may be generated.

In an embodiment of the apparatus according to the invention, the light modulators are designed in such a way that they modulate the state of polarization, particularly the direction of polarization, of the light shining on them preferably polarized linearly, wherein the light modulators are preferably realized by reflective or transmissive LCD modulators.

This enables the creation of polarization-modulated color frames by the light modulators. In such cases, an analyzer arranged in front of the intermediate image level is provided that can be illuminated with the modulated light from the light modulators, thus causing only light with a predetermined state of polarization to pass into the intermediate image level. This preferably causes only the light from the picture elements made bright by the light modulators to pass into the intermediate image level and then be projected on the projection screen by the projection optics.

The analyzer is preferably located between the intermediate image level and the optics system, thereby allowing the path of the illuminating rays of the light emitted by the light source that illumines the reflective light modulators, and the path of the projecting rays of the light reflected by the reflective light modulators being imaged into the intermediate image level to be superimposed into the optics system. This allows for a very compact construction of the apparatus according to the invention.

In particular, the light modulator may also be a tilting mirror matrix that includes numerous tilting mirrors provided in lines and columns, wherein the mirrors may be tilted independently from each other in a first and a second tilting position. In that case, the apparatus according to the invention is provided in such a way that the light reflected by the mirrors in the first tilting position reaches the intermediate image level, while the light reflected by the mirrors in the second tilting position-does not reach the intermediate image level. The tilting mirrors advantageously allow for the realization of an apparatus according to the invention, wherein the light illuminating the tilting mirror matrix does not have to be specially polarized, so that the losses incurred by a polarization of the light can be avoided.

The apparatus according to the invention may also advantageously be developed further, such that the optics system consists of a plano-convex lens and a silvered meniscus lens, wherein the boundary surface of the meniscus lens turned away from the plano-convex lens is silvered. The lens diameters are chosen large enough for each lens to be passed through twice in one reflection. In that case, the optics system includes only two optics elements which means that the costs of production and the adjustment needed are minor. Thus, an apparatus according to the invention is provided that can be manufactured very cost-efficiently overall.

It is also possible, of course, to replace the one plano-convex lens with two plano-convex lenses having a smaller diameter, which are then passed through only once for each image. In such cases, the optics system includes three elements, but due to their clearly smaller diameter, the production of the two plano-convex lenses is simpler than the production of the plano-convex lens with a large diameter.

In another advantageous embodiment of the apparatus according to the invention, the optics system includes not only a concave, but also a convex mirror. Thus, an optics system can be realized by no more than reflecting mirrors, so that no lenses manufactured in a complicated manner and from expensive materials are needed. This, too, allows for a more cost-effective realization of the apparatus according to the invention.

In addition, the optics system of the apparatus according to the invention may be such that it images not only an illuminated area generated with light from the light source on the light modulators, but also images the color frames in the intermediate image level. In that case, the optics system entirely assumes the function of an otherwise separate lighting optics that is provided between the luminous area and the light modulators and serves to illuminate the light modulators, so that no lighting optics has to be included in the apparatus according to the invention. This allows for a compact realization of the apparatus according to the invention.

The apparatus according to the invention can also be further developed such that it includes a control unit that triggers the light modulators on the basis of pre-determined picture data in order to generate the desired color frames with the light modulators.

Figure 2:
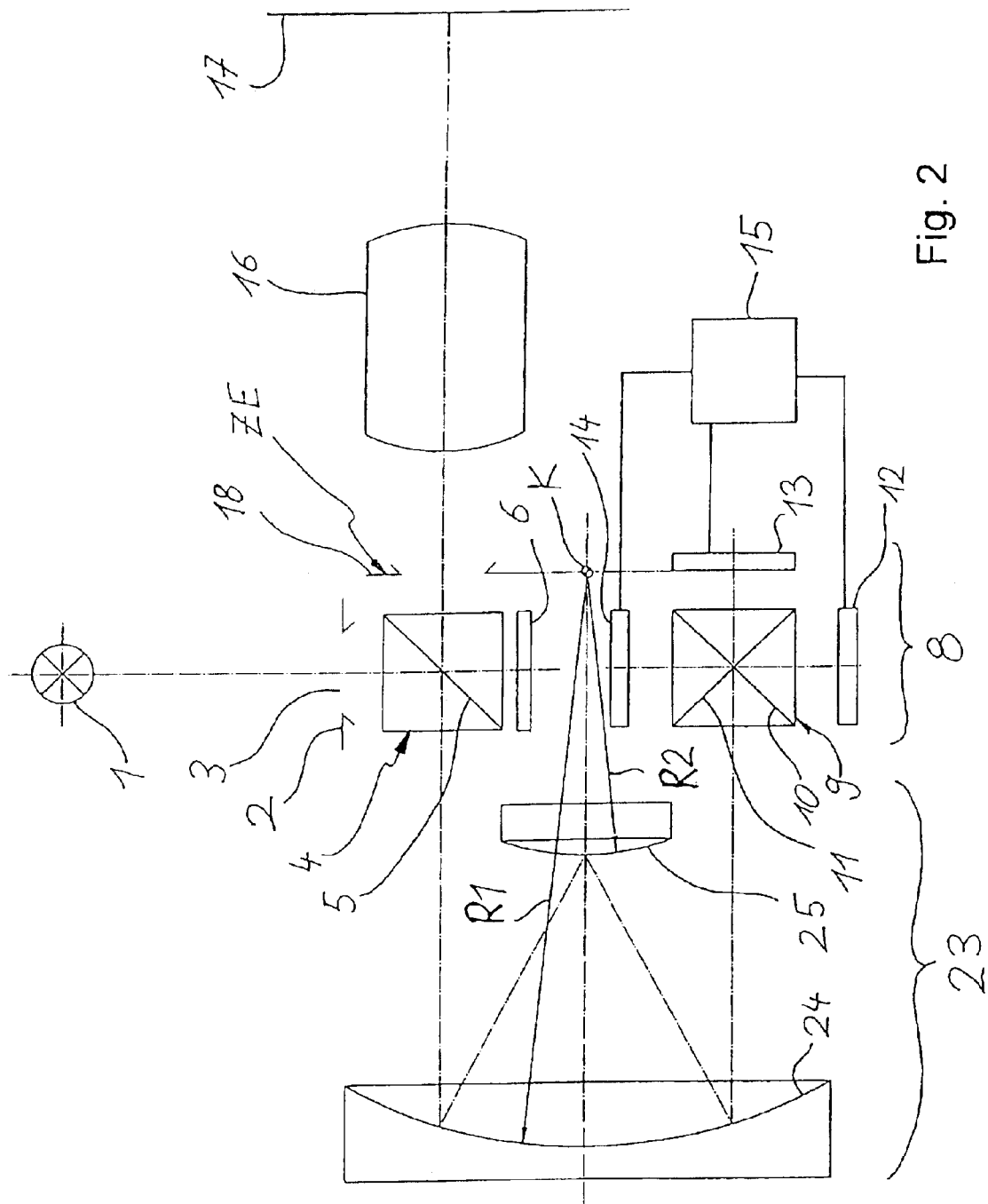
Figure 3:
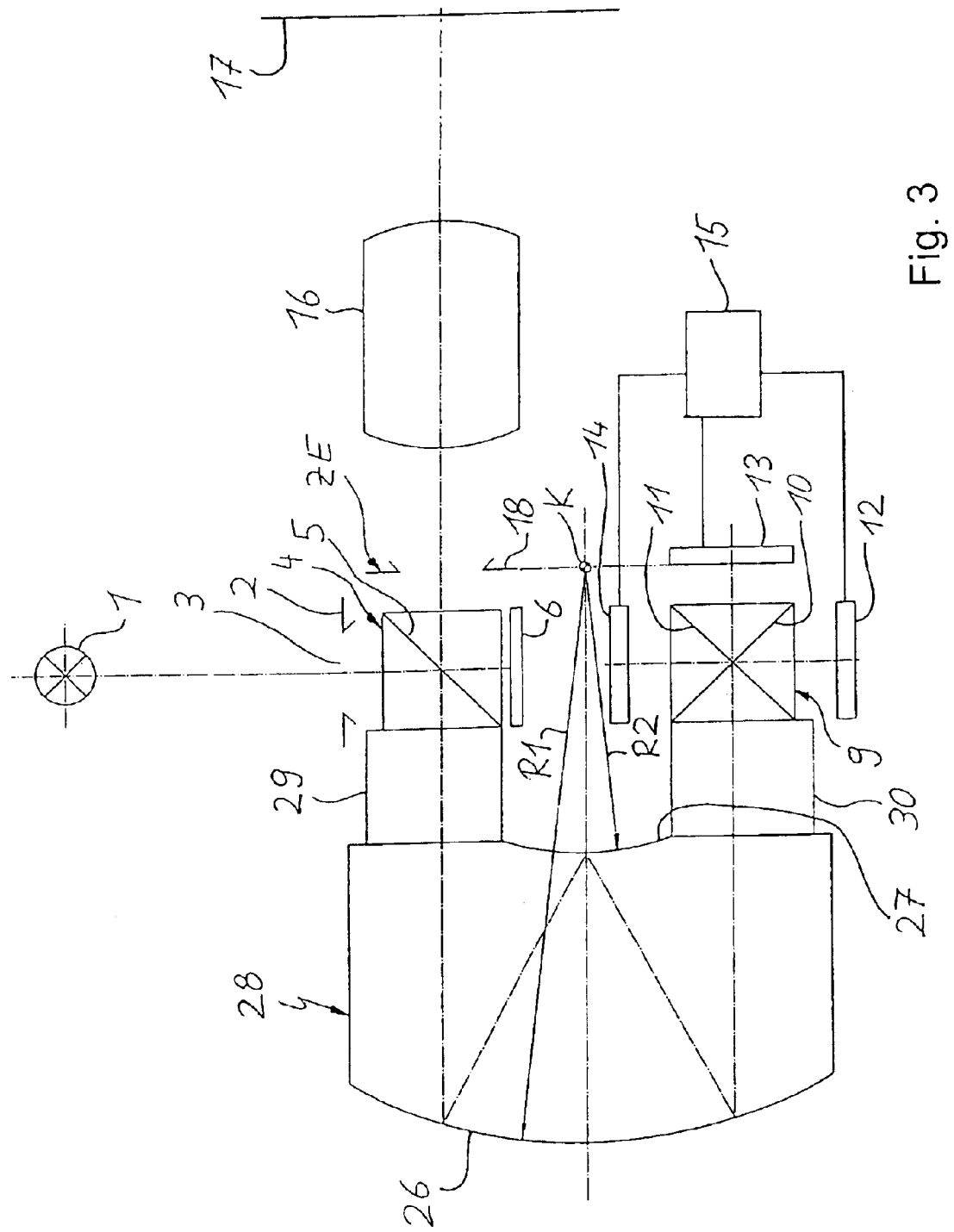
Figure 4:
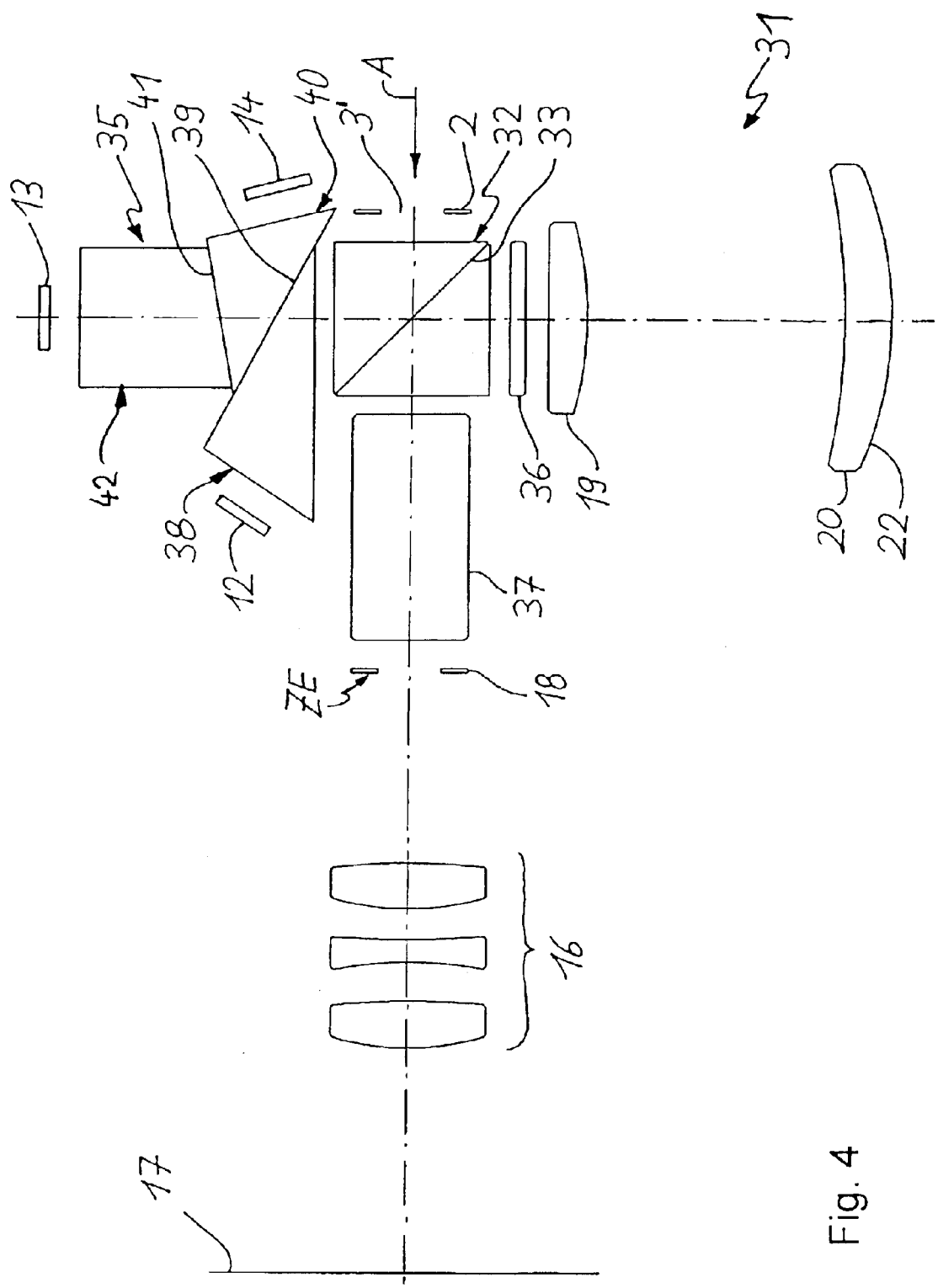
Figure 5:
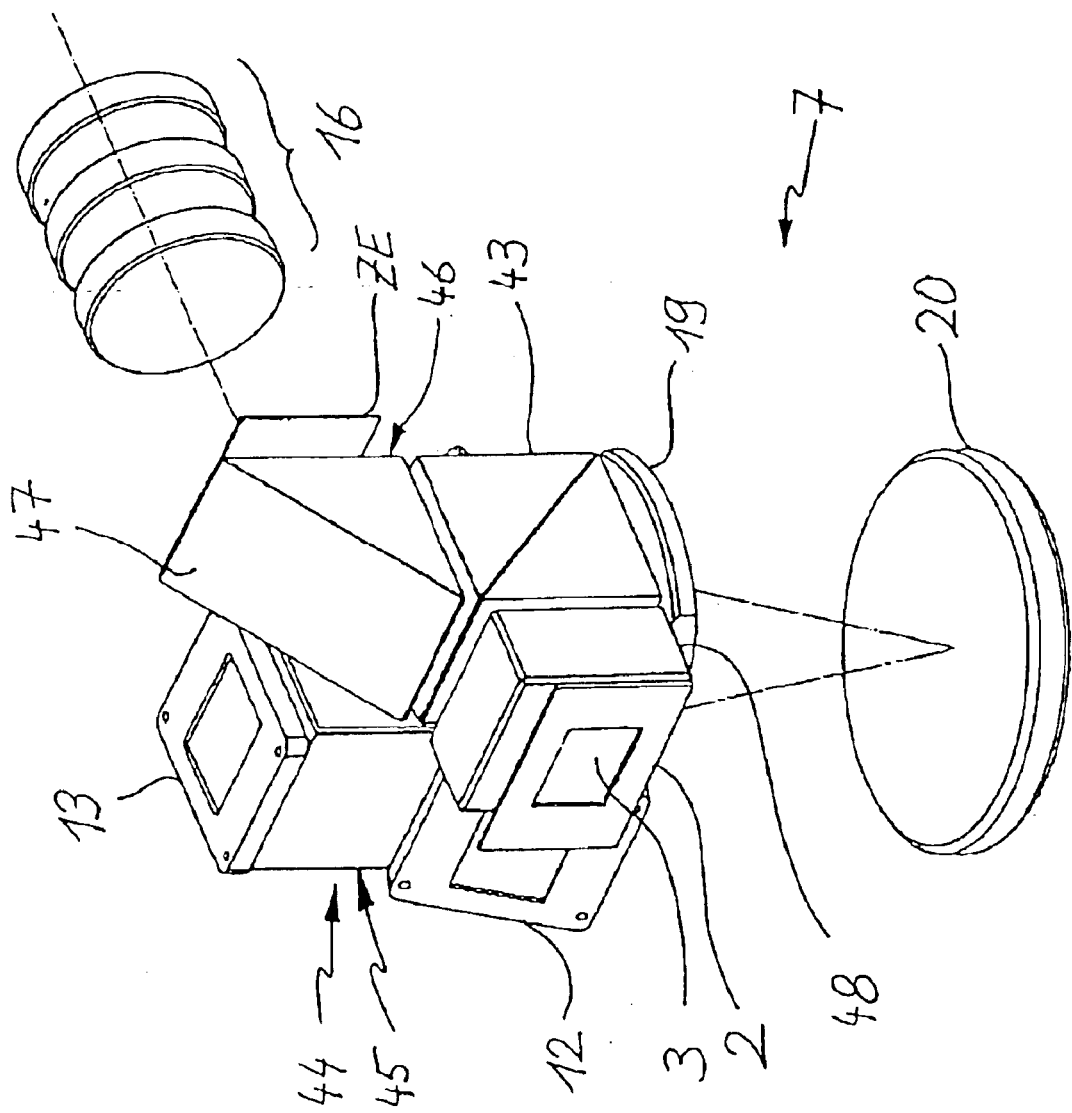
Figure 6:
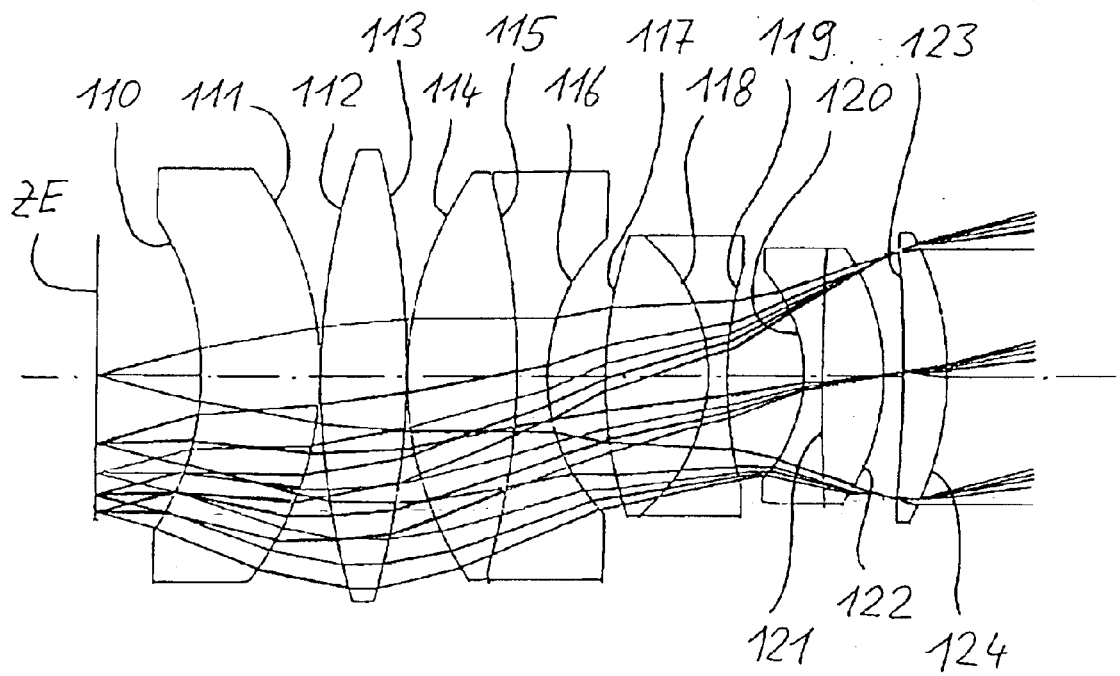

In the following, the invention is described in greater detail, using the drawings as examples. We can see:

FIG. 1 a schematic sectional depiction of the apparatus according to the invention based on a first embodiment;

FIG. 2 a schematic sectional depiction of a second embodiment of the apparatus according to the invention, wherein the optics system comprises a concave and a convex mirror;

FIG. 3 a schematic view of a different embodiment of the apparatus according to the invention;

FIG. 4 a schematic view of a different embodiment of the apparatus according to the invention;

FIG. 5 an exploded view of a different embodiment of the apparatus according to the invention;

FIG. 6 a sectional view of the projection optics of the apparatus according to the invention.

As can be seen from FIG. 1, the apparatus according to the invention in its first embodiment for the purpose of projecting a multi-colored picture on a projection screen includes a light source 1 (such as a halogen or an arc lamp) where its white light is received by a diaphragm 2, so that a luminous area 3 is generated in the aperture of the diaphragm 2, wherein the shape is pre-determined by the shape of the aperture. In the example shown here, the luminous area 3 includes a rectangular shape. The light of the luminous area 3 shines on a polarizing beam splitter cube 4 containing a polarizing beam splitter coating 5.

The polarizing beam splitter coating 5 of the polarizing beam splitter cube 4 reflects the light received from the luminous area 3 that is polarized linearly in a first direction (such as polarized perpendicularly to the plane of projection, s-polarization) so that linearly polarized light whose polarized direction is perpendicular to the plane of projection (seen in FIG. 1 as deflected left). Contrary thereto, the light polarized in a second direction (parallel to the plane of projection, p-polarization) passes through the polarizing beam splitter coating 5 and shines on a ray trap 6.

The light reflected at the polarizing beam splitter coating 5 (s-polarization) is being reflected on a color unit 8 by an optics system 7 that is arranged following the polarizing beam splitter 4.

The color unit 8 comprises a color beam splitter cube 9 having a first and a second color beam splitter coating 10, 11 that cross each other at a 90 degree angle and split the white light received from the optics system 7 into its red, green, and blue color components, wherein the color components are being directed into different color channels. In addition, the color unit 8 includes three reflexive light modulators (LCD modulators) 12, 13, and 14, wherein each of them is located in one of the color channels and can be illuminated with the light of the respective color. The light modulators 12, 13, and 14 are controlled by means of a trigger unit 15 on the basis of pre-determined picture data, such that the light reflected by the light modulators 12 through 14 is modulated depending on the color frames of the picture to be projected. Thus, polarization-modulated light is emitted by the light modulators 12 through 14, and one color frame each is generated on the light modulators 12 through 14.

The light and thus the color frames modulated by the light modulators 12, 13, 14 are reflected by the light modulators 12, 13, and 14 back to the color beam splitter cube 9 and are superimposed by it and then imagined by means of the optics system 7 into an intermediate image level ZE arranged following the polarizing beam splitter cube 4 (as will be described in detail later), and then projected to a projection screen 17 by means of a projection optics 16 arranged following the intermediate image level ZE. A diaphragm 18 is located in the intermediate image level ZE, wherein the intermediate image is located in its aperture, and wherein it provides a lateral boundary for the intermediate image.

The optics system 7 is provided such that the luminous area 3 is conjugated with the light modulators 12, 13, and 14 and/or their picture-generating areas. In addition, the picture-generating areas of the light modulators 12, 13, and 14 are conjugated with the intermediate image level ZE, wherein the optics system 7 is a symmetrical 1:1 image optics system. This is why the diaphragm 2 has been chosen such that its aperture and thus the luminous area 3 have the same size and shape as each of the equally embodied picture-generating areas of the light modulators 12, 13, and 14.

In the embodiment shown in FIG. 1, the optics system 7 includes a plano-convex lens 19 whose flat side 103 is turned towards the polarizing beam splitter cube 4 and the color beam splitter cube 9, and a meniscus lens 20 whose side 106 is turned away from the plano-convex lens 19 and includes a silvered coating 22 which causes the path of the rays inside the optics system 7 to be folded.

The apparatus of the optics system can be seen in the following Table 1 in n with FIG. 1:

TABLE 1

| Area Number | Bending radius (mm) | between the areas | Distance (mm) | Refractive Index | Abbe coefficient |
|---|---|---|---|---|---|
| 2 | | 2–101 | 2.00 | | |
| 101 | | 102–103 | 0.01 | | |
| 102 | | 103–104 | 27.72 | 1.5168 | 64.17 |
| 103 | | 104–105 | 271.80 | | |
| 104 | 130.088 | 105–106 | 10.40 | 1.6014 | 38.32 |
| 105 | 374.16 | 103–107 | 0.01 | | |
| 106 | 375.38 | 107–108 | 65.00 | | |
| 107 | | 108–109 | 2.00 | | |
| 108 | | | | | |
| 109 | | | | | |

The refractive index and the Abbe coefficient for the wavelength has been given as 587.6 mm here, and the polarizing beam splitter cube 4 has a longitudinal length of 65.00 mm, so that the intermediate image level ZE is 2.00 mm away from the side turned towards the projection optics 16. The distance of the light modulators 12 and 14 to the respective sides of the color beam splitter cube 9 is 2.00 mm as well.

The optics system 7 shown in FIG. 1 is a catadioptrics optics (it includes imaging mirrors and lenses) that on the one hand generates a 1:1 image of the luminous area 3 on the LCD modulators 12 through 14, and on the other hand generates a 1:1 image of the LCD modulators 12 through 14 into the intermediate image level ZE. The diameter of the plano-convex lens 19 is at least as large as the sum of the longitudinal length of the polarizing beam splitter cube 4 and that of the color beam splitter cube 7, so that the plano-convex lens 19 is being passed through twice during the images given. The plano-convex lens 19 may advantageously be replaced by two plano-convex lenses (not shown) having a smaller diameter.

A red, a green, and a blue color frame will be set on the LCD modulators 12 through 14 as follows: The light originating in the luminous area 2 [sic] (preferably white light) shines on the polarizing beam splitter coating 5 of the polarizing beam splitter cube 4 that directs the light being polarized linearly perpendicularly to the plane of projection on to the optics system 7 which in turn directs it on to the color unit 8. This light is split into its red, green, and blue color components in the color beam splitter cube 9 in such a way that the first color beam splitter coating 10 reflects blue light and directs it on the LCD modulator 14. The remaining color components pass through the color beam splitter coating 10. The second color beam splitter coating 11 reflects red light, so that it is directed on the LCD modulator 12, and lets the remaining color components pass through, so that green light reaches the LCD modulator 13.

The LCD modulators 12 through 14 are constructed identically and comprise a rectangular picture-generating area of 18.5 mm×13.9 mm or 26.4 mm×19.8 mm, to give an example, having a majority of pixels provided in lines and columns which can be triggered independently from each other by means of the trigger unit 15, wherein at least two different states can be set for each pixel. In a first state, the light shining on the respective pixel is being reflected without changing its direction of polarization, while in the second state the direction of polarization of the reflected light is turned by 90 degrees as opposed to the polarization of the incoming light.

In order to trigger a pixel as a bright picture element, the second state is set wherein the polarization is turned 90 degrees, so that this reflected light includes a p-polarization. Whenever the pixel is supposed to be triggered as a dark picture element, it is set in the first state where it may reflect the light, but does not change its polarization. This causes a polarization-modulated color frame to be set on the LCD modulators (or the picture-generating areas). These polarization-modulated color frames are imaged in the intermediate image level ZE through the color beam splitter 9 by means of the optics system 7, wherein the light also passes through the polarizing beam splitter cube 4 that now acts as an analyzer and only allows light with a p-polarization to pass through, and reflects the s-polarized light away to the light source 1, so that only the light of the pixels with a bright setting are imaged in the intermediate image level ZE.

The intermediate image thus imaged in the intermediate image level ZE is then projected on the projection screen 17 by means of the projection optics.

FIG. 2 shows another embodiment of the apparatus according to the invention for the purpose of projecting a picture on a projection screen, wherein this apparatus differs from that shown in FIG. 1 such that instead of the optics system 7, it has an optics system 23. All other elements correspond to those in FIG. 1, and have been given the same drawing references. For a description of these elements, please see the respective description of FIG. 1.

The optics system 23 includes a first and a second spherical mirror 24 and 25 that are provided such that they comprise a common optical axis and that their centers of curvature meet in a point K that is located in the intermediate image level ZE, wherein the first mirror 24 is concave, and the second mirror 25 is convex. The mirrors 24 and 25 are provided such that the light received from the polarizing beam splitter cube 4 shines on the first mirror 24, is there reflected to the second mirror 25 that in turn reflects the light back to the first mirror 24 from where it is then directed to the color unit 8 (the path of the ray within the optics system is thus W-shaped).

The radiuses of curvature R1 and R2 of the two mirrors 24 and 25 are selected such that the radius of curvature R1 of the first mirror 24 is twice as large as the radius of curvature R2 of the second mirror 25. The optics system 23 thus includes only two mirrors 24 and 25, which provides a 1:1 imaging system consisting of only two components having a multiply folded path of the rays with which can be realized a very compact projection apparatus, yet having great light transmitting intensity.

A further embodiment of the projection apparatus shown in FIG. 2 is shown in FIG. 3, wherein the two mirrors are realized by curved and silvered boundary surfaces 26, 27 of a glass block 28. In addition, contrary to the embodiment shown in FIG. 2, a first glass adapter 29 optically connecting the polarizing beam splitter cube 4 with the glass block 28, and a second glass adapter 30 optically connecting the color beam splitter cube 9 with the glass adapter 28, are provided. The glass adapters 29 and 30 are preferably cemented to the glass block 28, the polarizing beam splitter cube 4 and the color beam splitter 9, but they may be wrung together as well.

Another advantage of using the glass block 28 and the glass adapters 29, 30 (if provided) is that the angle of beam spread of the luminous beam inside the glass object is smaller than in air, so that the entire system can be more compact.

It is advantageous in this embodiment that compared to an arrangement without the glass adapters 29 and 30 the number of the glass-air boundary surfaces is reduced. Glass-air boundary surfaces are prone to contamination. In addition, the mirrors are formed by the silvered boundary surfaces 26 and 27 which means that these silvered areas do not have any boundary surface in the air and thus cannot be contaminated. The embodiment shown in FIG. 3 can naturally also be realized without the glass adapters 29 and 30.

FIG. 4 shows another embodiment of the projection apparatus according to the invention, where contrary to the embodiments described, the optics system 31 does not form the luminous area 3' on the LCD modulators 12 through 14, but only images the picture-generating areas of the LCD modulators 12 through 14 in the intermediate image level ZE, so that the optics system 31 is passed through only once.

In the embodiment shown in FIG. 4, a diaphragm 2 is illuminated with linearly-polarized light (arrow A), so that the luminous area 3 is generated with light that is already polarized and shines on a polarizing beam splitter cube 32 having a polarizing beam splitter coating 33 where the light is redirected upwards, as is shown in FIG. 4, and shines on a color unit 34 where a prism structure 35 for the purpose of separating the colors of the incoming light into its red, green, and blue components is provided. This light shines on the LCD modulators 12 through 14 and is polarization-modulated, wherein polarization-modulated color frames are set on the LCD modulators 12 through 14, and the modulated light is reflected back to the prism structure. This modulated light is superimposed by means of the prism structure 35, so that a common polarization-modulated luminous beam containing the color information of the desired color picture shines on the polarized beam splitter coating 33 of the polarized beam splitter cube 32 that reflects the dark pixels away towards the diaphragm 2, while the light of the bright pixels passes through the polarized beam splitter cube 33.

A retarder 36 is arranged following the polarized beam splitter cube 32, wherein the retarder converts the linear polarization of the lights shining on it into circular polarization (in a second pass through of this circularly polarized light through the retarder, the circular polarization is converted into linear polarization, wherein the direction of polarization of the circular polarization is now turned 90 degrees compared to the linear direction of polarization of the light originally shining on the retarder), and the optics system 31 is arranged following the retarder 36, wherein the optics system 31 is identical to the optics system 7 shown in FIG. 1.

The light passing through the retarder 36 thus passes through the plano-convex lens 19, shines on the meniscus lens 20 and is reflected on the silvered coating 22, which in turn causes it to pass through the meniscus lens 20, the plano-convex lens 19, and the retarder 36. Since the light reflected by the LCD modulators 12 through 14 of the bright pixels passes through the retarder 36 twice, the direction of polarization of this light is turned 90 degrees, so that it is reflected left on the polarized beam splitter coating 33 of the polarized beam splitter cube 32 (as seen in FIG. 4), and enters a glass cuboid 37 which is provided in order to make the optical distance between the LCD modulators 12 through 14 and the silvered coating 22 of the optics system 31 the same as the optical distance between the silvered coating 22 and the intermediate image level ZE. A diaphragm 18 is provided in turn in the intermediate image level ZE that forms the lateral boundary of the imaged intermediate image. The projection optics 16 is arranged following the intermediate image level ZE, wherein the projection optics 16 projects the intermediate image on the projection screen 17.

The chromatic separation and unification in the prism structure 35 takes place as follows: The polarized light enters into a first prism 38, wherein the blue color component is reflected on a coating 39 administered to a side of the prism 38 turned away from the polarized beam splitter cube and, inside the prism 38, is directed to the LCD modulator 12 by means of total reflection (on the boundary surface of the prism 38 to the polarized beam splitter 32). The remaining light passes through the coating 39 into a second prism 40 separated from the first prism 38 by a gap (not shown), wherein the red color component is reflected by the coating 41 provided on a side of the second prism 40 turned away from the first prism 38. The red light is then directed to the LCD modulator 14 by means of total reflection inside the prism 40. The remaining light and therefore the green light, passes through the coating 41 and enters into a third prism 42, passes through it and then shines on the LCD modulator 13. The light is polarization-modulated along the LCD modulators 12 through 14 and thereby reflected, so that the respective color frames are generated thereon. The reflected light passes through the prism structure 35 in the respective manner and is thereby combined to form a common color beam that shines on the polarized beam splitter coating 33 through which the dark pixels are reflected away. The light of the bright pixels passes through the polarized beam splitter coating 33 and is imaged in the intermediate image level by means of the optics system in the manner described.

FIG. 5 shows an exploded view of another embodiment of the apparatus according to the invention in perspective. In this embodiment, the optics system 7 and the arrangement of the polarized beam splitter cube 43 and the color unit 44 is the same as in the embodiment shown in FIG. 1, wherein a prism structure 45 is provided instead of a color beam splitter cube that corresponds to the prism structure 35 shown in FIG. 4. Contrary to the apparatus shown in FIG. 1, a deviating prism 46 is provided between the polarized beam splitter cube 43 and the intermediate image level ZE, wherein the deviating prism 46 turns the path of the rays 90 degrees and wherein the side 47 of the prism 46 where the deviation occurs can be silvered. However, total internal reflection (total reflection) is preferably utilized, in which case the boundary surface 47 is not silvered. Finally, a glass block 48 is provided between the diaphragm 2 and the polarizing beam splitter cube 4, wherein the glass block's dimensions are chosen such that the glass ways reaching from the luminous area 3 up to the LCD modulators 12 through 14 are equal to that of the glass way reaching from the LCD modulators 12 through 14 up to the intermediate image level ZE. In the apparatus shown in FIG. 5, the optics system 7 comprises not only the luminous area 3 on the picture-generating areas of the LCD modulators 12 through 14, but also the picture-generating areas of the LCD modulators 12 through 14 in the intermediate image level ZE. Its effectiveness is therefore identical to that of the embodiment shown in FIG. 1, wherein the embodiment shown in FIG. 5 can be a very compact apparatus due to the deviation by means of the deviating prism 46. Any other optical element with which such deviation can be accomplished, may naturally be utilized in place of the deviating prism 46.

FIG. 6 shows a possible embodiment of the projection optics 16, which can be used with any of the embodiments described above. The respective lens data may be taken from Table 2 below, wherein the refractive index and the Abbe coefficient have been given for a wave-length of 587.6 mm.

TABLE 2

| Area Number | Bending radius (mm) | Between the areas | Distance (mm) | Refractive Index | Abbe coefficient |
|---|---|---|---|---|---|
| 110 | 34.478 | ZE–110 | 12.18 | | |
| 111 | 39.999 | 110–111 | 14.00 | 1.803181 | 46.3799 |
| 112 | –90.065 | 111–112 | 0.10 | | |
| 113 | 103.131 | 112–113 | 10.00 | 1.803181 | 46.3799 |
| 114 | –42.048 | 113–114 | 0.10 | | |
| 115 | 83.089 | 114–115 | 13.00 | 1.617999 | 63.3335 |
| 116 | –22.786 | 115–116 | 3.60 | 1.558361 | 54.1572 |
| 117 | –53.434 | 116–117 | 6.80 | | |
| 118 | 21.066 | 117–118 | 12.00 | 1.617999 | 63.3335 |
| 119 | –50.036 | 118–119 | 2.20 | 1.620040 | 36.3665 |
| 120 | 18.361 | 119–120 | 8.85 | | |
| 121 | –342.74 | 120–121 | 2.20 | 1.717359 | 29.5128 |
| 122 | 27.12 | 121–122 | 7.00 | 1.617999 | 63.3335 |
| 123 | 202.45 | 122–123 | 2.20 | | |
| 124 | 37.417 | 123–124 | 5.00 | 1.850254 | 32.1699 |

What is claimed is:

1. Apparatus for projecting a multi-colored picture on a projection screen, having a light source that emits multi-colored light, a color unit, a first and a second light modulator arranged following the color unit, and a projection optics, wherein the color unit can be illuminated with the light from the light source and from that separates light of a first color and directs it on the first light modulator, and separates light of a second color and directs it on the second light modulator, wherein the light modulators modulate the lights shining on them, in order to generate one color frame each of the multi-colored picture, and wherein the modulated light is superimposed to form a common luminous beam, by means of the color unit, with which the projection optics is illuminated, the apparatus comprising an optics system illuminated with the common luminous beam and having a curved mirror provided between the color unit and the projection optics, wherein the optics system generates a multi-colored intermediate image in an intermediate image level arranged in front of the projection optics, and wherein the multi-colored intermediate image is projected by the projection optics on the projection screen as the multicolored picture.

2. Apparatus according to claim 1, wherein the optics system is a 1:1 image optics.

3. Apparatus according to claim 1, wherein the optics system is situated as a reduction optics.

4. Apparatus according to claim 3, wherein the optics system is provided symmetrically with respect to the mirror.

5. Apparatus according to one of claim 3, wherein the optics system is provided symmetrically with respect to the mirror.

6. Apparatus according to claim 1, wherein the optics system is a catadioptrics optics.

7. Apparatus according to claim 1, wherein the mirror of the optics system is a reflective coating on a curved boundary surface of a transparent optics element turned away from the color unit.

8. Apparatus according to claim 1, wherein the apparatus also comprises a third light modulator arranged following the color unit, wherein the color unit separates light of a third color from the light with which it is illuminated, and directs it on a third light modulator that modulates the light shining thereon, in order to set a third color frame of the multi-colored picture, and wherein the modulated light of the three light modulators is superimposed by means of the color unit to generate a common luminous beam.

9. Apparatus according to claim 8, wherein a red color frame may be set with the first light modulator, a green color frame may be set with the second light modulator, and a blue color frame may be set with the third light modulator.

10. Apparatus according to claim 1, wherein the light modulators modulate the state of polarization of the light shining on them, and that the analyzer arranged in front of the intermediate image level is provided which causes only light modulated with a pre-determined state of polarization to be received in the intermediate image level.

11. Apparatus according to claim 10, wherein the analyzer is provided between the intermediate image level and the optics system.

12. Apparatus according to claim 1, wherein the optics system comprises a plano-convex lens and a silvered meniscus lens.

13. Apparatus according to claim 1, wherein the optics system comprises a concave mirror and a convex mirror.

14. Apparatus according to claim 13, wherein the concave and the convex mirrors are realized by the silvered outer surfaces of a glass object.

15. Apparatus according to claim 1, wherein the light modulators are reflective light modulators.

16. Apparatus according to claim 15, wherein the optics system images a luminous area generated with light from the light source on the light modulators.

17. Apparatus for projecting a multi-colored picture on a projection screen comprising:

a light source that emits multi-colored light;

a color unit;

a first and a second light modulator arranged following the color unit;

a projection optics, wherein the color unit can be illuminated with the light from the light source and from that separates light of a first color and directs it on the first light modulator, and separates light of a second color and directs it on the second light modulator, wherein the first and second light modulators modulate the lights shining on them, in order to generate one color frame each of the multi-colored picture, and wherein the modulated light is superimposed to form a common luminous beam, by means of the color unit, with which the projection optics is illuminated; and an optics system illuminated with the common luminous beam and having a curved mirror disposed between the color unit and the projection optics, wherein the optics system generates a multi-colored intermediate image in an intermediate image level arranged in front of the projection optics, and wherein the multi-colored intermediate image is projected by the projection optics on the projection screen as the multi-colored picture.

18. Apparatus according to claim 17, wherein the optics system is situated as a reduction optics.

19. Apparatus according to one of claims 17, wherein the optics system is a catadioptrics optics.

20. Apparatus for projecting a multi-colored picture on a projection screen comprising:

a light source that emits multi-colored light;

a color unit;

a first and a second light modulator arranged following the color unit;

a projection optics, wherein the color unit can be illuminated with the light from the light source and from that separates light of a first color and directs it on the first light modulator, and separates light of a second color and directs it on the second light modulator, wherein the first and second light modulators modulate the lights shining on them, in order to generate one color frame each of the multi-colored picture, and wherein the modulated light is superimposed to form a common luminous beam, by means of the color unit, with which the projection optics is illuminated;

an optics system illuminated with the common luminous beam and having a curved mirror disposed between the color unit and the projection optics, wherein the optics system generates a multi-colored intermediate image in an intermediate image level arranged in front of the projection optics, wherein the multi-colored intermediate image is projected by the projection optics on the projection screen as the multi-colored picture; and a third light modulator arranged following the color unit, wherein the color unit separates light of a third color from the light with which it is illuminated, and directs it on a third light modulator that modulates the light shining thereon, in order to set a third color frame of the multi-colored picture, and wherein the modulated light of the three light modulators is superimposed by means of the color unit to generate a common luminous beam.

* * * * *